(12) United States Patent
Rott (10) Patent No.: US 10,059,360 B2
(45) Date of Patent: Aug. 28, 2018

(54) SKI-ATTACHABLE UPRIGHT CONVEYANCE

(71) Applicant: Ken Rott, Erie, CO (US)

(72) Inventor: Ken Rott, Erie, CO (US)

(*) Notice: Subject to any disclaimer, the term of this patent is extended or adjusted under 35 U.S.C. 154(b) by 32 days.

(21) Appl. No.: 15/349,983

(22) Filed: Nov. 11, 2016

(65) Prior Publication Data

US 2017/0137049 A1    May 18, 2017

Related U.S. Application Data

(60) Provisional application No. 62/255,249, filed on Nov. 13, 2015.

(51) Int. Cl.

| | |
|---|---|
| *B62B 13/10* | (2006.01) |
| *B62B 13/12* | (2006.01) |
| *B62B 13/14* | (2006.01) |
| *B62B 17/06* | (2006.01) |
| *B62B 17/08* | (2006.01) |
| *B62B 19/04* | (2006.01) |

(52) U.S. Cl.
CPC ............ *B62B 13/14* (2013.01); *B62B 17/061* (2013.01); *B62B 17/063* (2013.01); *B62B 17/065* (2013.01); *B62B 17/08* (2013.01); *B62B 19/04* (2013.01); *B62B 2206/06* (2013.01)

(58) Field of Classification Search
CPC ........ B62B 13/12; B62B 13/10; B62B 17/068
See application file for complete search history.

(56) References Cited

U.S. PATENT DOCUMENTS

| | | | | |
|---|---|---|---|---|
| 5,344,167 A | * | 9/1994 | Strouth | B62B 13/12 280/14.1 |
| 5,433,458 A | * | 7/1995 | Kampe | B62B 13/12 280/14.28 |
| 2009/0230641 A1 | * | 9/2009 | Eugenio | B62B 13/04 280/16 |

* cited by examiner

*Primary Examiner* — Bryan A Evans (57) ABSTRACT

A ski-attachable upright conveyance can have a swept-back handle, an upright frame, strengthening members, ski clamp attachments, a braking system, and a plurality of standing plates. The ski clamp attachments allow simple attachment to a variety of skis (skates, wheels, etc.) to form the base of the conveyance so that it can slide across snow, ice, etc. The standing plates provide a non-slip surface upon which a user places his/her feet, allowing the person to stand upright while operating the conveyance. A braking system can allow a user to safely control their speed, stop, etc. The upright frame sweeps upwards before joining the swept-back handle. The frame locks the ski clamp attachments together and provides rigidity. Additional rigidity and support can be added via strengthening support members. A user can vary the pressure and forces exerted on the swept-back handle to assist in steering.

20 Claims, 7 Drawing Sheets

SKI-ATTACHABLE UPRIGHT CONVEYANCE

TECHNICAL FIELD

The present invention relates generally to the field of human transportation; more specifically, to a ski-attachable upright conveyance.

BACKGROUND

Humankind has come a long way from the days when simple foot travel (i.e., walking and running) were the only means available for people to move from one location to another. Terrain that previously required months to traverse on foot can now be skipped over in mere hours using air vehicles, or in a day or two when employing motorized land vehicles. However, sometimes a simpler mode of transport is desired, one without the expense, noise, and congestion often associated with airplanes, cars, snowmobiles, etc.

When it came to movement over land without the use of animals or engines, human powered vehicles were some of the earliest improvements over walking. In colder climates, when snow and ice covered the area to be traversed, humans developed skis and sleds for transportation. In warmer climes, wheeled vehicles such as bicycles eventually became commonplace.

Skis, although useful, have some inherent problems including being somewhat unstable, requiring a certain amount of practice to utilize effectively, and requiring significant energy in order to propel oneself along a flat or inclined surface. Sleds, on the other hand, are much more stable, and require little if any practice to become proficient in their use. However, it can be difficult for a person riding in a sled to push the sled forwards unless it is being used on a slope or there is someone/something pulling or pushing the sled. In order to address this issue, people have long utilized the pulling ability of animals (such as sled dogs, horses, etc.) to move sleds. Alternatively, some sleds have been developed that allow people to kick or otherwise propel themselves without the need for animals. For example, one sled, called a kick-sled, has two long ski-like runners and upright handles that allow a user to stand on the runners and kick between them to propel the sled forwards. Such kick-sleds can be useful on relatively flat ice or snow, but tend to be difficult to maneuver or turn and also rapidly become unsafe when an increasing downward slope is encountered, as they do not have any braking system. The runners built into such sleds are purpose-built and not interchangeable, requiring different sleds when used on different terrain/surfaces, such as powdery snow versus ice.

What is needed is a ski-attachable upright conveyance that allows a person to stand upright, propel themselves across varying terrain, safely control their speed when traveling down-slope, and easily switch skis depending on the terrain and uses to which the vehicle is put. Additionally, the conveyance should be able to be attached to wheels or skates for use in warmer climates or when snow and ice are not present.

BRIEF SUMMARY OF THE INVENTION

A ski-attachable upright conveyance comprises a swept-back handle, an upright frame, strengthening support members, ski clamp attachments, a braking system, and a plurality of standing plates. The ski clamp attachments are adapted to allow a person to easily attach or detach a variety of skis to the base of the conveyance so that it can slide across snow, ice, etc. The skis can be changed based on changing terrain and conditions, for example, thin cross-country skis can be used on flat, ice covered expanses, while wide downhill powder skis can be used in deep powder and/or hilly terrain. The ski clamp attachments can also allow attachment of skates or other wheeled devices so that the conveyance can be used in warmer climates or when ice/snow are not present. Integrated into the base of the conveyance is a braking system which allows a user to safely control their speed when traveling down slopes. The braking system can have a plurality of step brake blocks wherein each block is hingedly attached to a base strengthening support member, thereby allowing the user to simply step on the back of the step brake block in order to actuate it. A brake gripping member can be attached to the bottom of each step brake to engage whatever surface is being traveled over and brake the conveyance through friction therewith. The plurality of standing plates are detachably attached to the upper rear surface of skis, rearward extensions of skates, etc. They provide a non-slip surface upon which a user places his/her feet, allowing the person to stand upright while operating the conveyance. The upright frame attaches to the ski clamp attachments and then sweeps upwards before joining the swept-back handle. The upright frame locks the ski clamp attachments together at a fixed distance and provides rigidity and support to the conveyance. Additional rigidity and support are added by the strengthening support members. In one embodiment, three such members are utilized: a base strengthening support member which extends horizontally between the base members of the upright frame and two brace support members which extend from the base members to the upright members. The swept-back handle provides a secure location for the user to grasp the conveyance with her hands. The user can vary the pressure and forces she is exerting on the swept-back handle to assist in steering the conveyance. The handle is swept back on both ends in order to help the conveyance slip easily through brushy areas where bushes, tree branches, etc. would otherwise catch straight handles and cause crashes, navigation troubles, etc. Additional features in other embodiments can include an integrated fold-down seat, equipment straps, cargo platform, rod holders, pulling attachment point, and others.

DETAILED DESCRIPTION

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples. Similarly, in this disclosure, language such as "could, should, may, might, must, have to, can, would, need to, is, is not", etc. and all such similar language shall be considered interchangeable whenever possible such that the scope of the invention is not unduly limited. For example, a comment such as: "item X is used" can be interpreted to read "item X can be used".

Exemplary embodiments are described below in the accompanying Figures. The following detailed description provides a comprehensive review of the drawing Figures in order to provide a thorough understanding of, and an enabling description for, these embodiments. One having ordinary skill in the art will understand that in some cases well-known structures and functions have not been shown or described in detail to avoid unnecessarily obscuring the description of the embodiments In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples.

Figure 1:
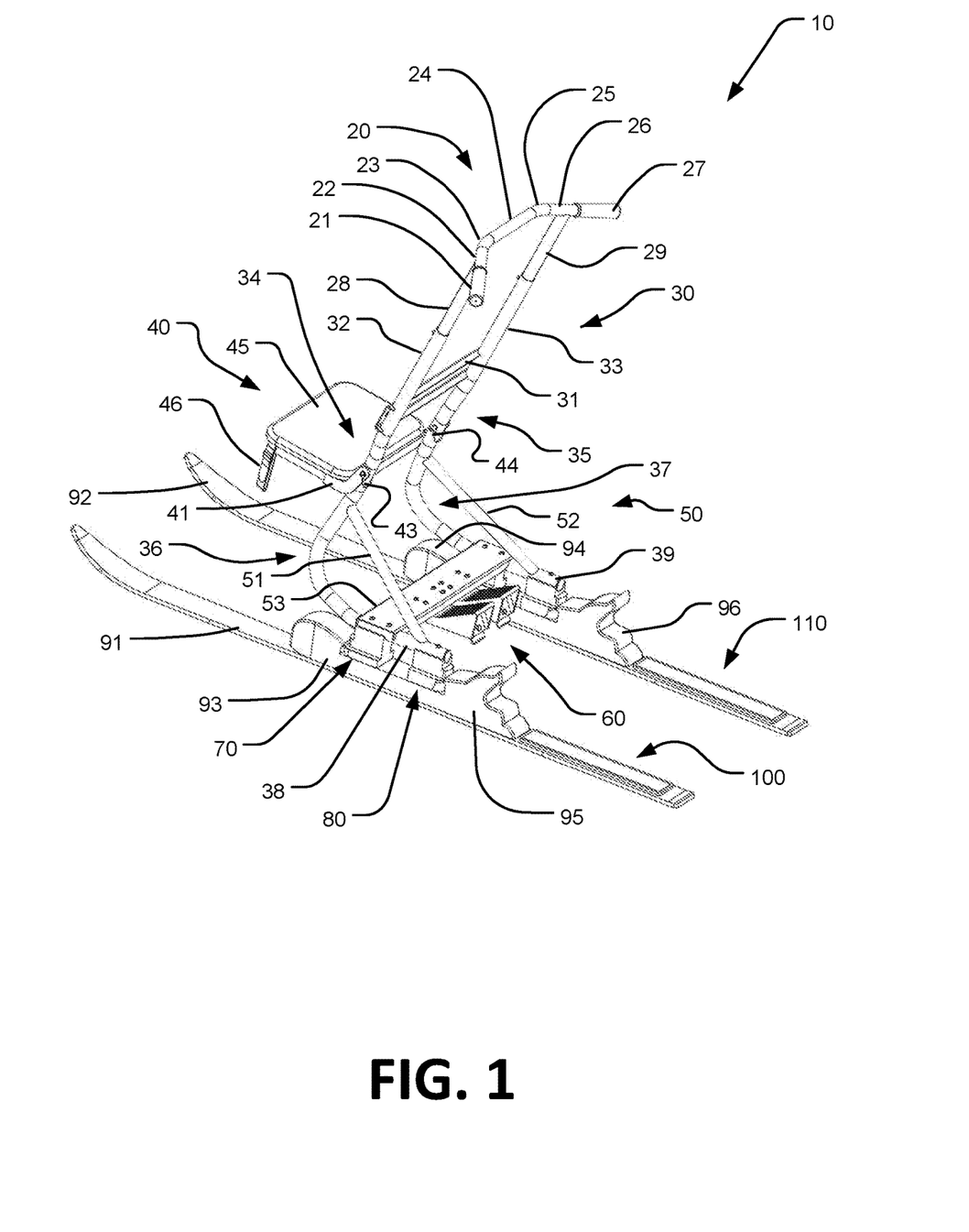
FIG. 1 illustrates a left side perspective view of an exemplary embodiment of a ski-attachable upright conveyance.

Referring now to the drawings, FIG. 1 illustrates a left side perspective view of an exemplary embodiment of a ski-attachable upright conveyance 10. The conveyance 10 comprises a swept-back handle 20, an upright frame 30, a plurality of strengthening support members 50, a braking system 60, a plurality of ski clamp attachments 70 and 80, and a plurality of standing plates 100 and 110. Additional components in other embodiments can include an integrated fold-down seat, equipment straps, cargo platforms, rod holders, pulling attachment points, and others.

The plurality of ski clamp attachments 70 and 80 are adapted to allow a person to easily attach or detach a variety of skis 91 and 92 to the base of the conveyance 10. Skis 91 and 92 are commonly available and used ski equipment can often be located at a very low price. Thus, a user can inexpensively acquire a variety of skis to accommodate varying terrain and conditions. Ski clamp attachments 70 and 80 resemble the shape of, and function similarly to, the ends of ski boots. Basically, they have a relatively stiff and rigid lip which fits under or otherwise locks in place in the standard bindings of skis. By operating the release handle on the rear of most ski bindings, the ski clamp attachments can pop out of the binding, just like standard ski boots would. It is contemplated that custom, or non-standard, bindings can be accommodated on the conveyance 10, by replacing the ski clamp attachments 70 and 80 with the components that mate with such bindings on the associated ski boots. Such replacements can also be referred to as ski clamp attachments 70 and 80, as they serve a similar function and but differ in that they are not exactly the same as or compatible with standard format bindings. The ski clamp attachments 70 and 80 have a corresponding mirror pair that attach to the other ski—see items 74 and 84 in FIG. 3. The ski clamp attachments can also accommodate attachment of skates or other wheeled devices by integrating common ski bindings onto the skates or wheeled devices. Alternatively, the ski clamp attachments can be removable so that other binding attachments can be affixed to the conveyance 10 to accommodate the attachment means of skates or other wheeled devices. By allowing wheeled devices to attach to the conveyance 10, a user can continue to use the conveyance when snow/ice are not present.

Integrated into the base of the conveyance 10 is a braking system 60 which allows a user to safely control their speed. This is especially important when traveling down slopes, as the expedient of simply dragging a foot can be dangerous, ineffective, and can cause the conveyance 10 to turn or tip unexpectedly. The braking system 60 can have a plurality of step brake blocks 61 and 62 (see FIG. 3 for detail) wherein each block is hingedly attached to a base strengthening support member 53, thereby allowing the user to simply step on the back of the step brake block 61 and 62 in order to actuate it. The brake block 61 and 62 then hinges downwards and contacts the surface over which the conveyance is traveling. Dragging the block across the surface produces varying amounts of friction which the user can control in order to stop or slow down the conveyance as desired.

A plurality of standing plates 100 and 110 are detachably attached to the upper rear surface of skis 91 and 92, rearward extensions of skates, etc. They provide a non-slip surface upon which a user places his/her feet, allowing the person to stand upright while operating the conveyance. The plates 100 and 110 can snap over the sides of skis 91 and 92, attach via screws, hook and loop, adhesive, etc. Plates can be permanently affixed to each ski/skate/etc. that is attached to the conveyance, or they can be made to be removable and switched between each attached ski/skate/etc. The important function that the plates 100 and 110 provide, is to give the user a solid, non-slip surface upon which to stand while astride the conveyance 10. In order to propel himself, a person leaves one foot on a standing plate 100 and 110 and places the other foot on the ground/snow/ice between the left and right skis/skates/etc. Then, with a backward kicking motion (like that used to propel a skateboard), the user can push the conveyance 10 forward. By repeating the procedure multiple times, the user can increase the forward speed of the conveyance 10.

An upright frame 30 attaches to the ski clamp attachments 70 and 80 and then sweeps upwards before joining the swept-back handle 20. The upright frame 30 locks the ski clamp attachments 70 and 80 together at a fixed distance and provides rigidity and support to the conveyance 10. Base members 38 and 39 extend longitudinally approximately parallel to the ground and attach to the ski clamp attachments 70 and 80. The base members 38 and 39 are attached to upwards- and inwards-curving roll members 36 and 37, respectively. The roll members 36 and 37 encapsulate the horizontal to vertical directional transition of the upright frame 30, by bending first upwards and then even slightly backwards, forming an angle of between seventy and one hundred and thirty degrees with the base members 38 and 39. In another embodiment, the roll members 36 and 37 attach to, and extend out of, the rear of the base members 38 and 39. In this embodiment, the roll members 36 and 37 would curve back forwards to again ensure that the attached swept-back handle 20 is positioned approximately above the center of the ski clamp attachments 70 and 80. The frame curves help to distribute the load more evenly over the length of the skis and perform a load transfer function.

In the embodiment illustrated in FIG. 1, the roll members 36 and 37 curve or angle slightly inwards as they extend upwards. In other embodiments, this inwards curve could occur to a greater or lesser degree, may be non-existent, or may even curve outwards.

The inwards curve of the roll members 36 and 37 can help to accommodate attachment of an integrated fold-down seat 40 having a smaller width than the distance between the base members 38 and 39. In the embodiment illustrated in FIG. 1, the integrated fold-down seat 40 has a sitting surface 45, a pair of fold-down hinge supports 41 and 42 (42 is not visible in FIG. 1, see FIG. 4), removable seat pins 43 and 44, and a securing strap 46. The removable seat pins 43 and 44 removably attach the integrated fold-down seat 40 to the upright frame 30. The user can remove the seat 40 by simply unlatching the pins 43 and 44 and withdrawing them from their ports in the frame 30. In other embodiments, the integrated fold-down seat 40 is not removable. In yet other embodiments, a fixed, non-folding seat is used instead. Additional embodiments could include no seat(s). The securing strap 46 can be used as a seat belt to secure a user in the seat, or it can be used to secure cargo in place.

Figure 4:
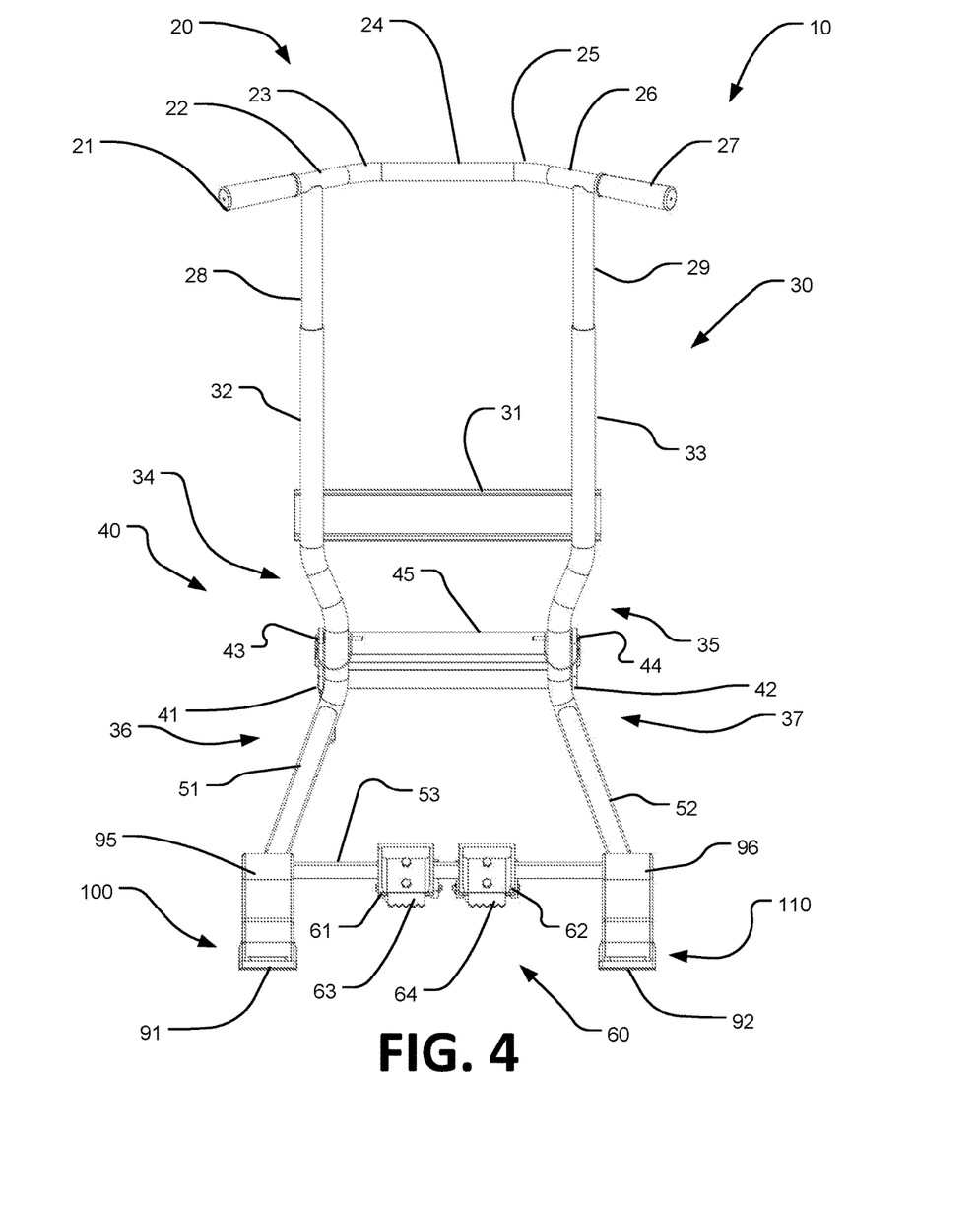
FIG. 4 illustrates a rear elevation view of an exemplary embodiment of a ski-attachable upright conveyance.

Attached to the tops of the roll members 36 and 37 are seat members 34 and 35 (see FIG. 4 for a more detailed view). The seat members 34 and 35 form a portion of the upright frame 30 that extends from the roll members to the height adjustment members 32 and 33. The seat members 34 and 35 can curve outwards following attachment of the seat 40, as shown in FIG. 4. In other embodiments, the seat members 34 and 35 curve outwards to a greater/lesser degree, do not curve outwards, or even curve inwards. In embodiments that do not include a seat 40, an additional strengthening member may be used to attach between either the roll members 36 and 37 or between the seat members 34 and 35 to provide additional strength and rigidity to the upright frame 30.

In the embodiment shown in FIG. 1, a cross-back member 31 extends approximately perpendicular to the height adjustment members 32 and 33 and fixedly attaches them to each other. This attachment helps to provide additional strength and rigidity to the upright frame while also providing a back rest for anyone utilizing the integrated fold-down seat 40. Furthermore, the cross-back member 31 can serve as a tie-down point for securing cargo on the conveyance 10.

The height adjustment members 32 and 33 are adapted to adjustably interface with the handle extensions 28 and 29. In the embodiment shown in FIG. 1, the handle extensions 28 and 29 each fit down inside their corresponding height adjustment member 32 and 33, respectively. In other embodiments, the handle extensions 28 and 29 fit over the adjustment members 32 and 33. In yet other embodiments, other interface means are contemplated.

In the embodiment shown in FIG. 1, a pop-up button is integrated within each handle extension 28 and 29. The pop-up buttons can each spring up and engage one of a series of stop holes running down the height adjustment members 32 and 33 (see FIG. 5 for a depiction of representative stop holes in the adjustment members 32 and 33). A user can depress the pop-up buttons and adjust the position of the handle extensions 28 and 29 relative to the height adjustment members 32 and 33, and the pop-up buttons will automatically pop-up and lock in to other stop holes in the adjustment members 32 and 33. Other means of adjusting the height of the handle 20 relative to the frame 30 are contemplated.

Strengthening support members 50 can add rigidity and strength to the conveyance 10. In one embodiment, three such members 50 are utilized: a base strengthening support member 53 which extends horizontally between the base members 38 and 39 and runs approximately perpendicular thereto, and two brace support members 51 and 52 which extend upwards from a rear portion of the base members 38 and 39 to an upper portion of the upright frame 30. The upright frame 30 can be built sufficiently heavy such that no brace support members 51 and 52 are necessary, but efficiencies can be had by lightening the upright frame 30 and including brace support members 51 and 52.

The swept-back handle 20 provides a secure location for the user to grasp the conveyance 10 with her hands. Grip handles 21 and 27 can be attached to the ends of the handle 20. Such grip handles can be cushioned, form-fitted, have finger grooves, be heated, have wind blocking shields attached, etc. Moving inwards from the grip handles 21 and 27 are the T bars 22 and 26. The T bars 22 and 26 join the grip handles 21 and 27 to the handle extensions 28 and 29, respectively. The swept-back transition members 23 and 25 are angled to join the swept back T bars 22 and 26 to the center bar 24. Since the ends of the handle 20 are swept back, the transition members 23 and 25 are needed to bring both ends of the handle 20 in line with each other so they can be joined by the center bar 24.

The handle 20 is swept back on both ends in order to help the conveyance slip easily through brushy areas where bushes, tree branches, etc. would otherwise catch straight handles and cause crashes, navigation troubles, etc.

Additional features in other embodiments can include equipment straps, cargo platform, rod holders, pulling attachment, and others.

Figure 2:
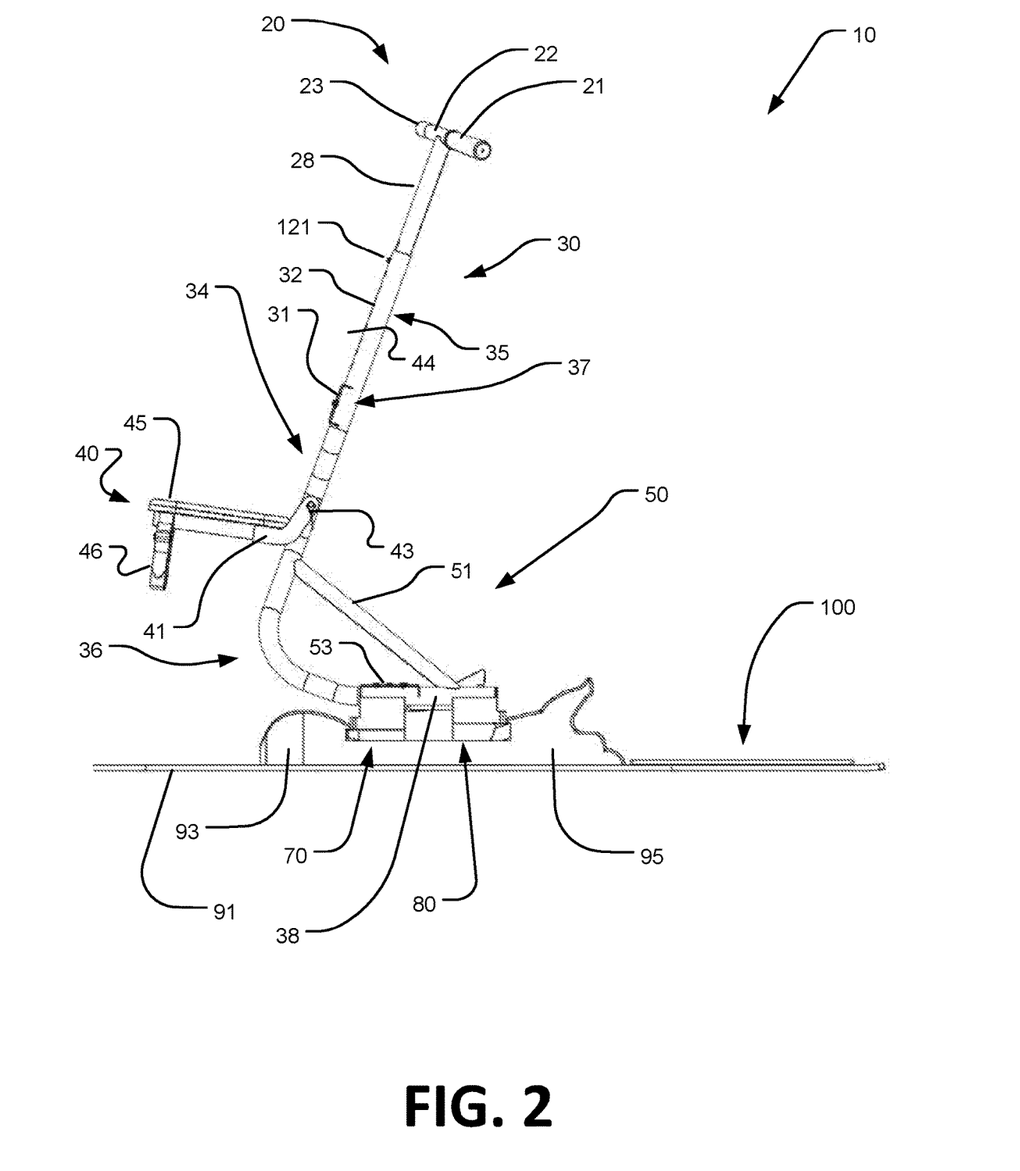
FIG. 2 illustrates a left side elevation view of an exemplary embodiment of a ski-attachable upright conveyance.

FIG. 2 illustrates a left side elevation view of an exemplary embodiment of a ski-attachable upright conveyance 10. This view provides a better angle for illustrating the shape and structure of the fold-down hinge supports 41 and 42 (42 is not visible in FIG. 1, see FIG. 4). Also, the nature of the forwards and backwards curves of the upright frame 30 used in the embodiment in FIGS. 1 and 2 can be seen. Note the shape of the locking lips of the plurality of ski clamp attachments 70 and 80 also visible at the extreme front and rear of the attachments 70 and 80, respectively.

Figure 3:
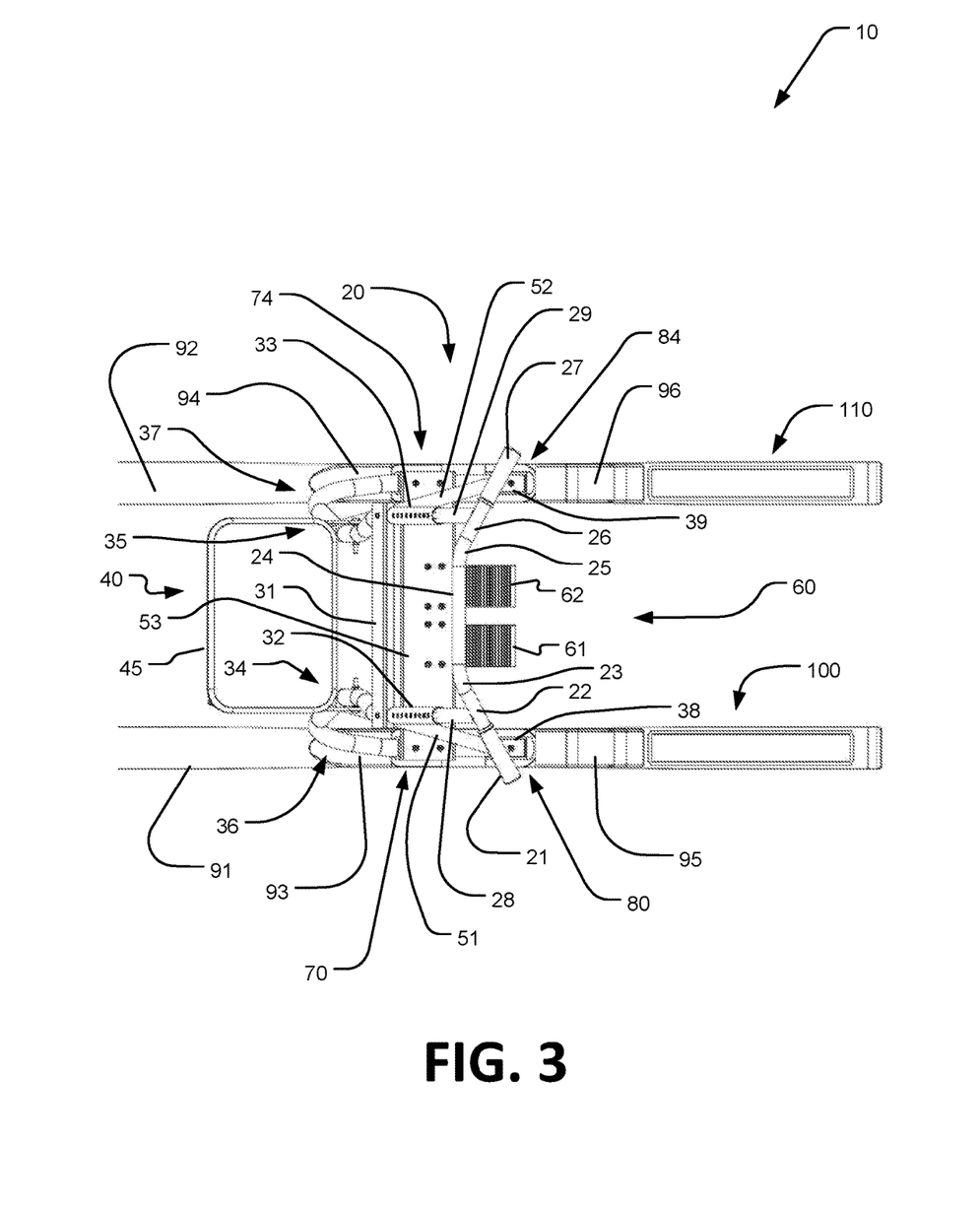
FIG. 3 illustrates a top plan view of an exemplary embodiment of a ski-attachable upright conveyance.

FIG. 3 illustrates a top plan view of an exemplary embodiment of a ski-attachable upright conveyance 10. In this view, the individual step brake blocks 61 and 62 are easily discerned as is the gripping striations running along the top surfaces of the brake blocks 61 and 62. The striations help the users foot to grip the blocks and not slide off of them when applying pressure to activate the braking function of the brake system 60. Also apparent in this view are the skis 91 and 92, the spacing between them, and the ski bindings (front ski binding 93 and rear ski binding 95 on the first ski 91, and front ski binding 94 and rear ski binding 96 on the second ski 92). The bindings receive between them the plurality of ski clamp attachments 70 and 80 and their mirrors on the opposite ski, ski clamp attachments 74 and 84. By locking the ski clamp attachments in place, the ski bindings securely hold the conveyance 10 in position against the skis 91 and 92. However, since that hold is secured by the ski bindings, and because ski bindings are designed to break free from the ski when enough torque is applied (say, for instance, when a "wreck" occurs, i.e., if the user were to crash), the ski-attachable upright conveyance 10 can also break free from the skis when necessary to help minimize damage if a wreck were to occur.

FIG. 4 illustrates a rear elevation view of an exemplary embodiment of a ski-attachable upright conveyance 10. This view highlights the inwards and outwards curves of the upright frame 30 (see frame components 36, 37, 34, 35, 32 and 33). Because the conveyance 10 may be used in brushy areas, it is an advantage to have the frame curve inwards from the skis so as to minimize the opportunity for bushes, branches, trees, etc. to strike the seat and frame. A reduced seat size also reduces the weight of the components and the wind resistance (especially when the seat is in an upright, stored position).

The upright frame functions as a brush guard for the driver when traversing areas with bushes, shrubs, and other impediments to travel. Thus, it is useful to use a dual-upright design as in the embodiments shown in FIGS. 1-7. Furthermore, the dual-uprights help distribute weight across the two skis/skates/etc. and help to maximize stability and minimize distortion of the skis when under load.

A brake gripping member 63 and 64 (see FIG. 4) can be attached to the bottom of each step brake block 61 and 62, respectively, to engage whatever surface is being traveled over when the braking system 60 is activated. Any wear that occurs can, in that way, be limited to the brake gripping members 63 and 64 rather than to the step brake blocks 61 and 62 themselves. Furthermore, by making the gripping members 63 and 64 replaceable, a user can simply remove worn out versions and install new ones. Additionally, a user can install particular types of brake gripping members 63 and 64 that are more appropriate for the type of surface over which he will be traveling. For example, strong steel teeth might be best for ice (say when traversing a frozen lake) while tough rubber pads might work better when traversing concrete with skates installed in place of skis.

Figure 5:
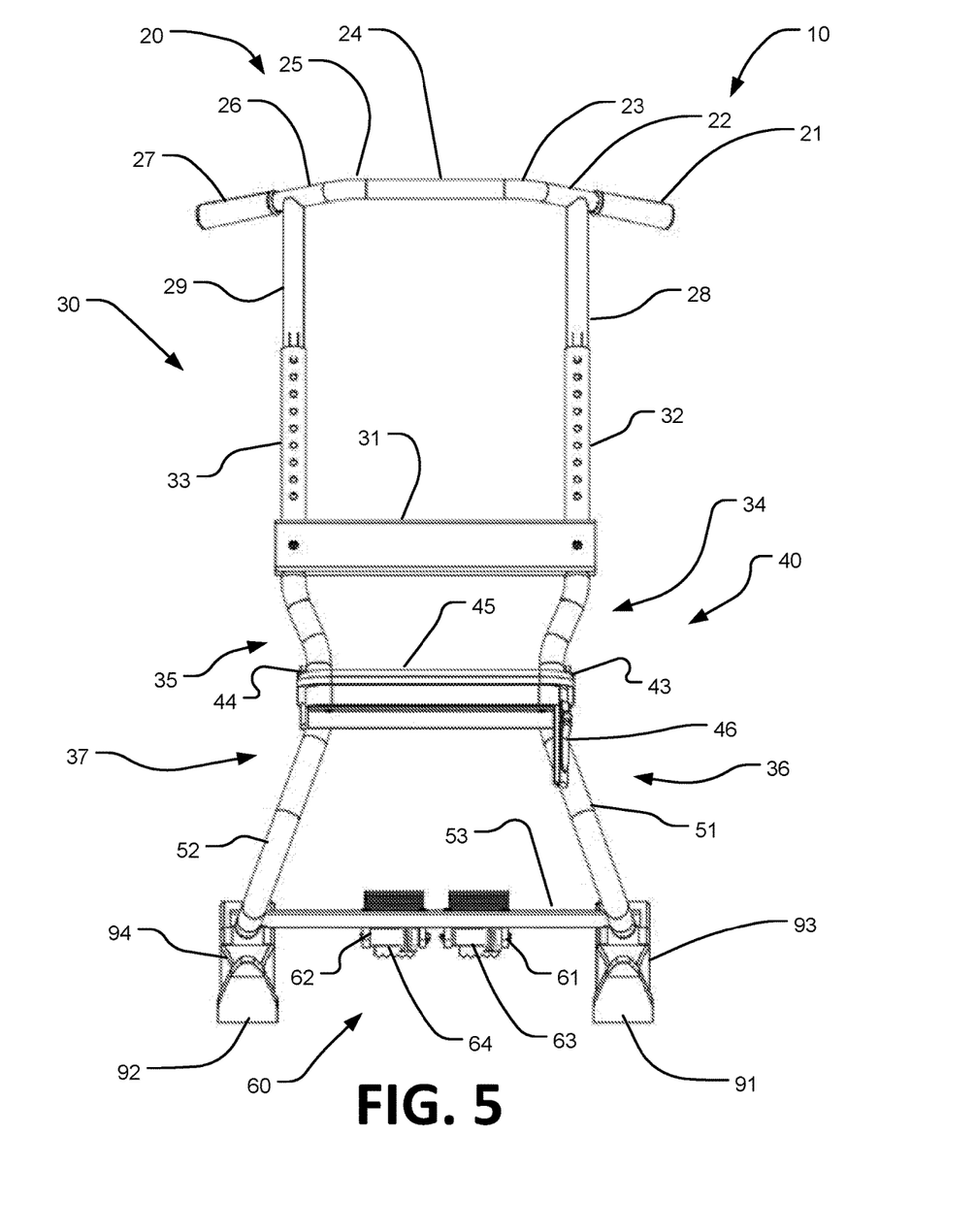
FIG. 5 illustrates a front elevation view of an exemplary embodiment of a ski-attachable upright conveyance.

FIG. 5 illustrates a front elevation view of an exemplary embodiment of a ski-attachable upright conveyance 10. This view highlights a few of the features only partially visible earlier. For example, the stop holes running down the height adjustment members 32 and 33 are clearly visible in this view. Note the position of the fold down seat 40. When sitting on the seat, a persons feet would tend to be located on the surface (the ground, snow, ice, etc.) between the skis. As this arrangement would be dangerous were the conveyance under way, it is not advised that a "passenger" utilize the seat at some times. Instead, the seat 40 is designed for the user's convenience once his destination has been reached (or to use during rest stop breaks in the travel). For example, if the conveyance 10 is being used to transport a person to a favorite fishing spot on an iced-over lake, upon arrival, the user can simply flip the seat down and begin fishing (assuming the hole in the ice hasn't frozen over while the fisherman was away!).

Figure 6:
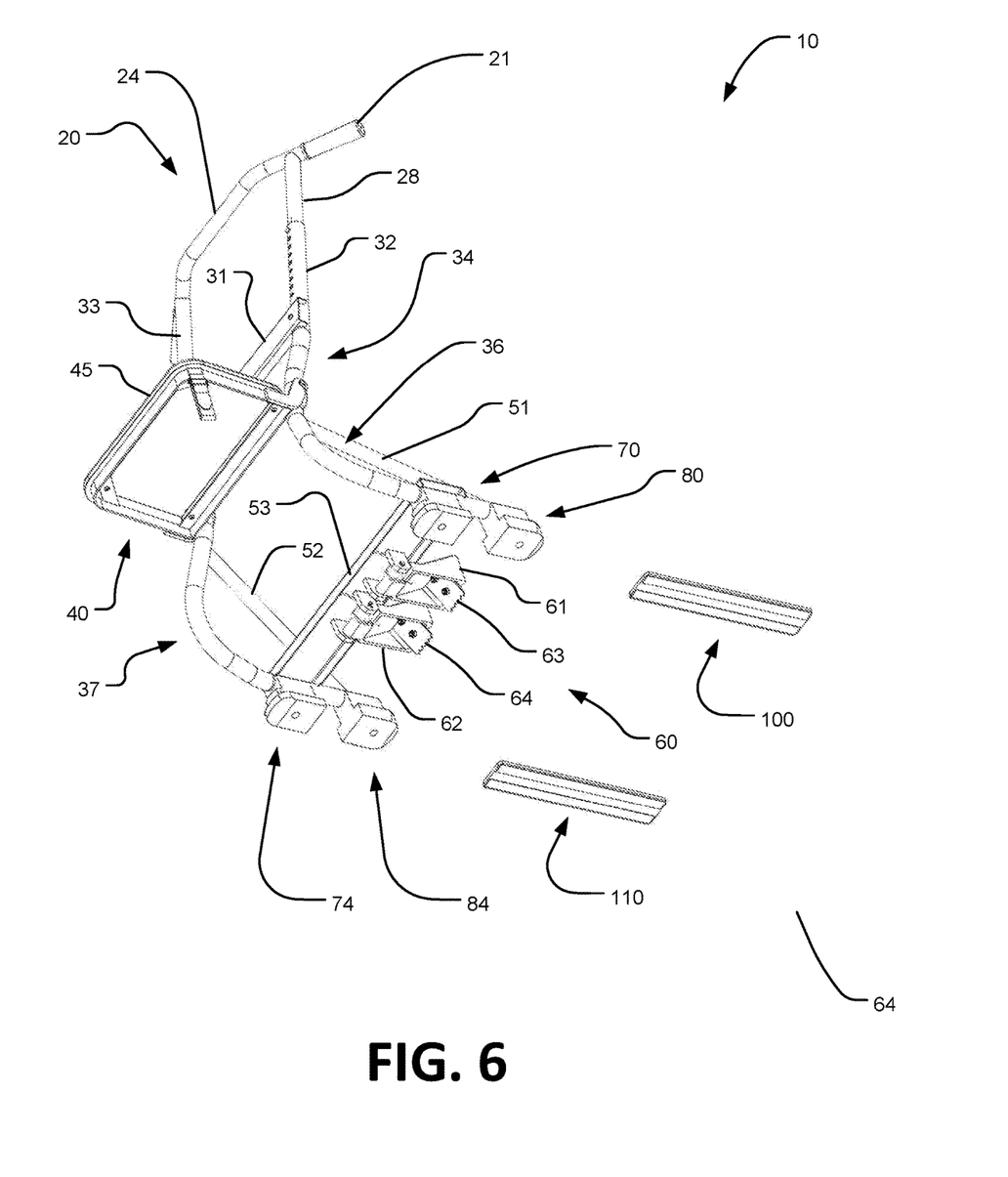
FIG. 6 illustrates a bottom perspective view of an exemplary embodiment of a ski-attachable upright conveyance.

FIG. 6 illustrates a bottom perspective view of an exemplary embodiment of a ski-attachable upright conveyance 10. In this view, the skis and bindings have been removed to better show the conveyance 10 itself. Note the underlying structure of the braking system 60 in the embodiment illustrated in FIG. 6: the plurality of step brake blocks 61 and 62 are hollow underneath to provide a larger "biting" surface when the brakes are applied. The teeth of the brake gripping members 63 and 64 are visible as are the hinges and springs that keep the brake blocks 61 and 62 in an upwards position when the brake system 60 is not activated and help them to return to that position after activation.

FIG. 6 also highlights the shape and location of the plurality of standing plates 100 and 110 as the skis are not otherwise obscuring them. In this embodiment, the plates 100 and 110 each have two long connecting strips visible on their bottom surfaces. The connecting strips attach the plates to the skis (or other items). As discussed above, the plates can be removably attached or they can be permanently affixed such that multiple plates would be needed, one set for each set of skis/skates/etc.

Figure 7:
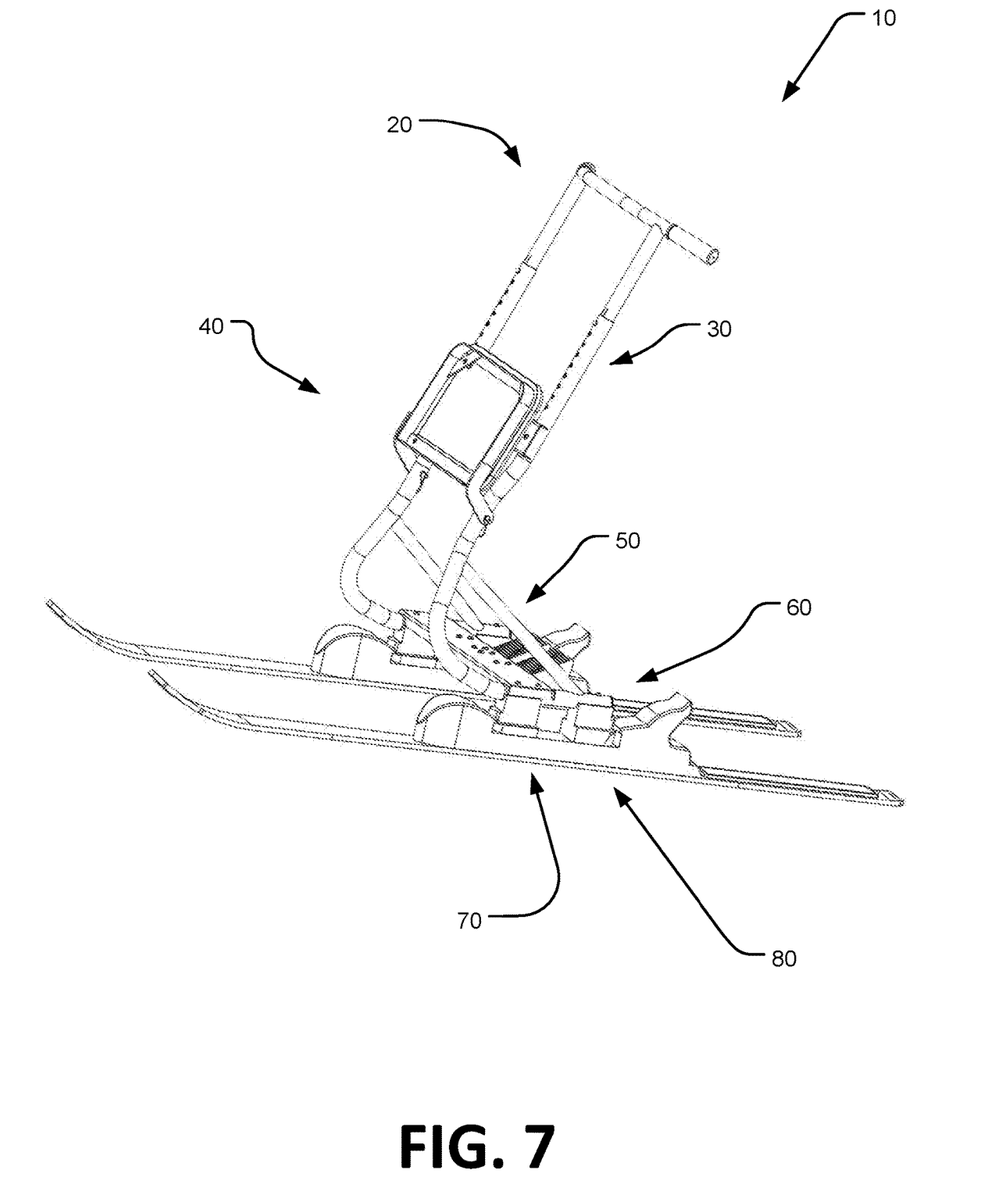
FIG. 7 illustrates a perspective view of an exemplary embodiment of a ski-attachable upright conveyance with an integrated fold-down seat in a stowed configuration.

FIG. 7 illustrates a perspective view of an exemplary embodiment of a ski-attachable upright conveyance with an integrated fold-down seat 40 in a stowed configuration. Here, only the higher-level components (swept-back handle 20, upright frame 30, fold-down seat 40, plurality of strengthening support members 50, braking system 60, and plurality of ski clamp attachments 70 and 80) are referenced so as to lessen the obfuscation caused by a plethora of reference lines and numbers.

In light of the above "Detailed Description," the inventor may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventor. As discussed herein, specific terminology used when describing certain features or aspects should not be taken to imply that the terminology is being redefined herein to be restricted to any specific characteristics, features, or aspects of the embodiments with which that terminology is associated.

While certain aspects are presented below in certain claim forms, the inventor contemplates the various aspects in any number of claim forms. Accordingly, the inventor reserves the right to add additional claims after filing the application to pursue such additional claim forms for other aspects.

The above specification, examples and data provide a description of the structure and use of exemplary implementations of the described systems, articles of manufacture and methods. It is important to note that many implementations can be made without departing from the spirit and scope of the disclosure.

The invention claimed is:

1. A downhill ski binding attachable upright conveyance, comprising:
 an upright frame;
 a second plurality of; binding blocks capable of clipping into standard downhill ski bindings:
 a swept-back handle;
 a foot operated braking system; consisting of two brake blocks offset from center, hinged and spring suspended above grade, also providing an additional steering system, equipped with replaceable brake cloys for the expected wear,
 a plurality of standing plates;
 the upright frame having a first base member and a second base member;
 the first base member extending generally horizontally and the second base member extending generally parallel to the first base member;
 the first base member attached to the first plurality of, ski clamp attachments and the second base member attached to the second plurality of ski clamp attachments;
 the upright frame having a first roll member and a second roll member, the first roll member attached to the first base member and the second roll member attached to the second base member;
 the first and second roll members transitioning the upright frame from extending generally horizontally to extending generally upwards;
 the upright frame locking the first and second pluralities of ski clamp attachments together at a fixed distance and providing rigidity and support to the conveyance;
 the first plurality of ski clamp attachments removably receiving a first ski in connection to the first base member;
 the second plurality of ski clamp attachments removably receiving a second ski in connection to the second base member;
 the swept-back handle attached to the upright frame and having a first grip handle and a second grip handle, the first and second grip handles forming a secure location for a user's hands to grasp the conveyance;

a center bar extending between the first and second grip handles;

the braking system attached to the upright frame and positioned so that the user can activate the braking system and thereby slow the conveyance; and the plurality of standing plates detachably attached to upper rear surfaces of the first and second skis, the standing plates having a non-slip surface upon which a user's feet are placed when standing on the conveyance.

2. The ski-attachable upright conveyance of claim 1, further comprising:

a base strengthening support member extending generally horizontally between the first base member and the second base member; a first strengthening support member extending upwards from a first rear portion of the first base member to a first upper portion of the upright frame; and a second strengthening support member extending upwards from a second rear portion of the second base member to a second upper portion of the upright frame.

3. The ski-attachable upright conveyance of claim 1, wherein the generally upwards extension of the frame upright is angled between forty degrees forwards of vertical and forty degrees rearwards of vertical.

4. The ski-attachable upright conveyance of claim 2, wherein the generally upwards extension of the frame upright is angled between forty degrees forwards of vertical and forty degrees rearwards of vertical.

5. The ski-attachable upright conveyance of claim 1, further comprising: wherein the first plurality of ski clamp attachments comprises a first front ski clamp attachment and a first rear ski clamp attachment, and the second plurality of ski clamp attachments comprises a second front ski clamp attachment and a second rear ski clamp attachment; the first front ski clamp attachment has a rigid front lip which releasably locks in place in a ski binding on the first ski; the first rear ski clamp attachment has a rigid rear lip which releasably locks in place in the ski binding on the first ski; the second front ski clamp attachment has a second rigid front lip which releasably locks in place in a second ski binding on the second ski; the second rear ski clamp attachment has a second rigid rear lip which releasably locks in place in the ski binding on the second ski.

6. The ski-attachable upright conveyance of claim 2, further comprising: wherein the first plurality of ski clamp attachments comprises a first front ski clamp attachment and a first rear ski clamp attachment, and the second plurality of ski clamp attachments comprises a second front ski clamp attachment and a second rear ski clamp attachment; the first front ski clamp attachment has a rigid front lip which releasably locks in place in a ski binding on the first ski; the first rear ski clamp attachment has a rigid rear lip which releasably locks in place in the ski binding on the first ski; the second front ski clamp attachment has a second rigid front lip which releasably locks in place in a second ski binding on the second ski; the second rear ski clamp attachment has a second rigid rear lip which releasably locks in place in the ski binding on the second ski.

7. The ski-attachable upright conveyance of claim 3, further comprising: wherein the first plurality of ski clamp attachments comprises a first front ski clamp attachment and a first rear ski clamp attachment, and the second plurality of ski clamp attachments comprises a second front ski clamp attachment and a second rear ski clamp attachment; the first front ski clamp attachment has a rigid front lip which releasably locks in place in a ski binding on the first ski; the first rear ski clamp attachment has a rigid rear lip which releasably locks in place in the ski binding on the first ski; the second front ski clamp attachment has a second rigid front lip which releasably locks in place in a second ski binding on the second ski; the second rear ski clamp attachment has a second rigid rear lip which releasably locks in place in the ski binding on the second ski.

8. The ski-attachable upright conveyance of claim 4, further comprising: wherein the first plurality of ski clamp attachments comprises a first front ski clamp attachment and a first rear ski clamp attachment, and the second plurality of ski clamp attachments comprises a second front ski clamp attachment and a second rear ski clamp attachment; the first front ski clamp attachment has a rigid front lip which releasably locks in place in a ski binding on the first ski; the first rear ski clamp attachment has a rigid rear lip which releasably locks in place in the ski binding on the first ski; the second front ski clamp attachment has a second rigid front lip which releasably locks in place in a second ski binding on the second ski;

the second rear ski clamp attachment has a second rigid rear lip which releasably locks in place in the ski binding on the second ski.

9. The downhill ski binding attachable upright conveyance of claim 1, further comprising:

the braking system consisting of two brake blocks offset from center, hinged and spring suspended above grade, also providing an additional steering system, equipped with replaceable brake claws for the expected wear; said hinged brake blocks attached to base strengthening support member.

10. The ski-attachable upright conveyance of claim 8, further comprising:

the braking system having at least one step brake block; the step brake block is hingedly attached at a front portion to the base strengthening support member, thereby allowing the user to step on a back portion of any step brake block in order to actuate the block; and once stepped upon, the step brake block hinges downwards and contacts a surface over which the conveyance is traveling, dragging a bottom portion of the step brake block across the surface and producing friction which slows the conveyance.

11. A ski-attachable upright conveyance, comprising:

a frame; a first plurality of ski clamp attachments; a second plurality of ski clamp attachments; a swept-back handle; a braking system; a plurality of standing plates and; a seat; the frame having a first base member and a second base member; the first base member extending generally horizontally and the second base member extending generally parallel to the first base member; the first base member attached to the first plurality of ski clamp attachments and the second base member attached to the second plurality of ski clamp attachments; the frame having a first bend and a second bend, the first bend attached to the first base member and the second bend attached to the second base member; the first and second bends extending forwardly from the first and second base members to generally upright frame portions;

the frame locking the first and second pluralities of ski clamp attachments together at a fixed distance and providing rigidity and support to the conveyance; the first plurality of ski clamp attachments removably receiving a first ski in connection to the first base member; the second plurality of ski clamp attachments removably receiving a second ski in connection to the second base member; the swept-back handle attached to the frame and having a first grip handle and a second grip handle, the first and second grip handles forming a secure location for a user's hands to grasp the conveyance; a center bar extending between the first and second grip handles; the braking system attached to the frame and positioned so that the user can activate the braking system and thereby slow the conveyance; the plurality of standing plates detachably attached to upper rear surfaces of the first and second skis, the standing plates having a non-slip surface upon which a user's feet are placed when standing on the conveyance; and the seat attached to the frame and having a sitting surface for receiving a person thereon, the seat providing additional strength and rigidity to the frame.

12. The ski-attachable upright conveyance of claim 11, further comprising:
a cross-back member extending generally horizontally and attached to the frame above the seat and providing a back rest.

13. The ski-attachable upright conveyance of claim 11, further comprising: a height adjustment member attached between the frame and the swept-back handle and functioning to adjustably raise and lower the height of the swept-back handle relative to the base members.

14. The ski-attachable upright conveyance of claim 12, further comprising: a height adjustment member attached between the frame and the swept-back handle and functioning to adjustably raise and lower the height of the swept-back handle relative to the base members.

15. The ski-attachable upright conveyance of claim 11, the seat further comprising:
a first fold-down hinge support and a second fold-down hinge support; the hinge supports hingeably connecting the seat to the frame such that the seat is repositionable between a folded-up configuration against the frame when not in use and a folded-down configuration when in use.

16. The ski-attachable upright conveyance of claim 14, the seat further comprising:
a first fold-down hinge support and a second fold-down hinge support; the hinge supports hingeably connecting the seat to the frame such that the seat is repositionable between a folded-up configuration against the frame when not in use and a folded-down configuration when in use.

17. The ski-attachable upright conveyance of claim 11, further comprising;
a base strengthening support member extending generally horizontally between the first base member and the second base member;
a first strengthening support member extending upwards from a first rear portion of the first base member to a first upper portion of the frame; and a second strengthening support member extending upwards from a second rear portion of the second base member to a second upper portion of the frame.

18. The ski-attachable upright conveyance of claim 16, further comprising:
a base strengthening support member extending generally horizontally between the first base member and the second base member; a first strengthening support member extending upwards from a first rear portion of the first base member to a first upper portion of the frame; and a second strengthening support member extending upwards from a second rear portion of the second base member to a second upper portion of the frame.

19. The ski-attachable upright conveyance of claim 18, further comprising: wherein the first plurality of ski clamp attachments comprises a first front ski clamp attachment and a first rear ski clamp attachment, and the second plurality of ski clamp attachments comprises a second front ski clamp attachment and a second rear ski clamp attachment; the first front ski clamp attachment has a rigid front lip which releasably locks in place in a ski binding on the first ski; the first rear ski clamp attachment has a rigid rear lip which releasably locks in place in the ski binding on the first ski; the second front ski clamp attachment has a second rigid front lip which releasably locks in place in a second ski binding on the second ski; the second rear ski clamp attachment has a second rigid rear lip which releasably locks in place in the ski binding on the second ski.

20. The ski-attachable upright conveyance of claim 11, further comprising:
the braking system having at least one step brake block; the step brake block is hingedly attached at a front portion to the base strengthening support member, thereby allowing the user to step on a back portion of any step brake block in order to actuate the block; and once stepped upon, the step brake block hinges downwards and contacts a surface over which the conveyance is traveling, dragging a bottom portion of the step brake block across the surface and producing friction which slows the conveyance.

* * * * *